(No Model.)
J. GARSED.
SKEIN REEL.
No. 381,771. Patented Apr. 24, 1888.
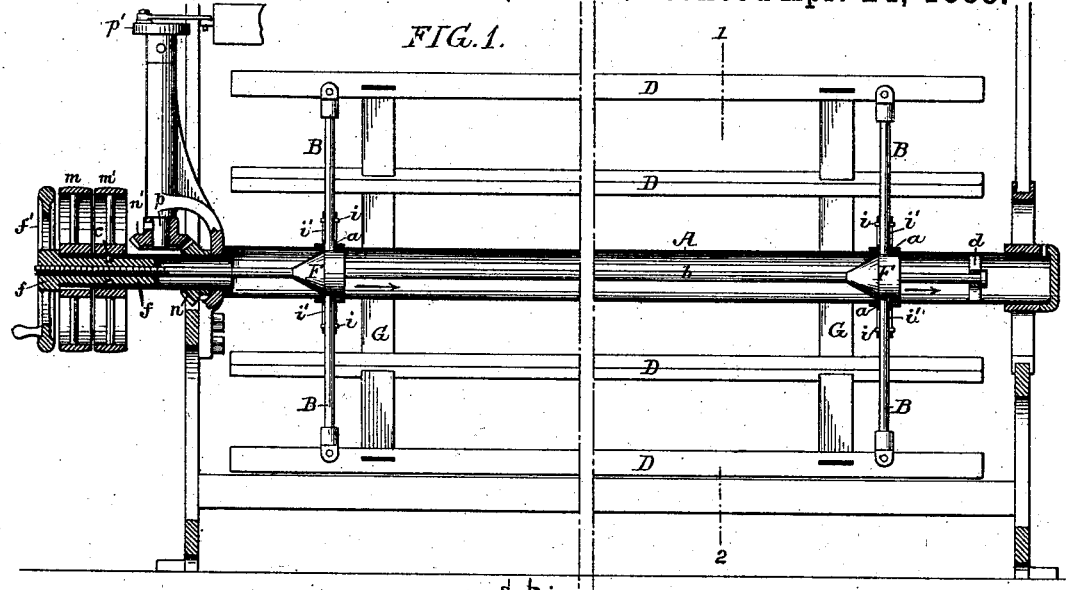
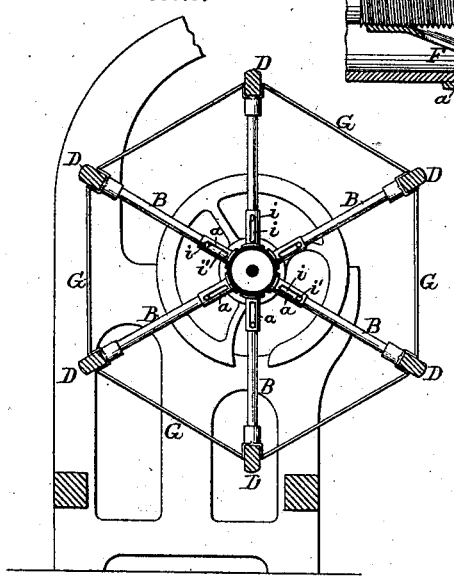
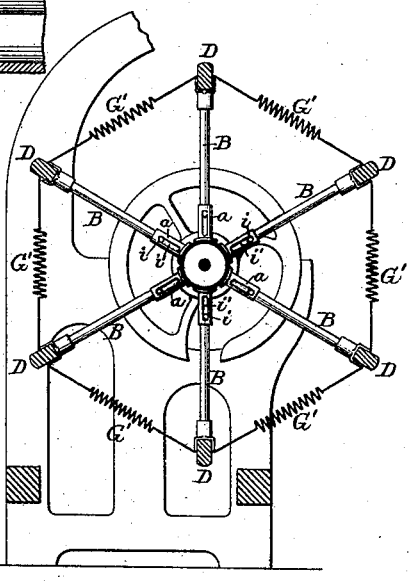
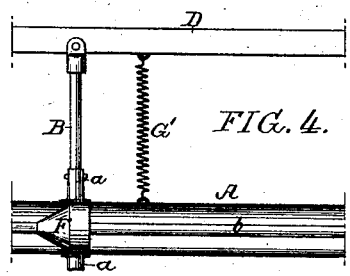
Witnesses
John E. Parker.
Wm. D. Conner.
Inventor.
Joshua Garsed.
by his Attorneys.
Howson & Howson.

UNITED STATES PATENT OFFICE.

JOSHUA GARSED, OF PHILADELPHIA, PENNSYLVANIA.

SKEIN-REEL.

SPECIFICATION forming part of Letters Patent No. 381,771, dated April 24, 1888.

Application filed January 23, 1888. Serial No. 261,569. (No model.)

*To all whom it may concern:*

Be it known that I, JOSHUA GARSED, a citizen of the United States, and a resident of Philadelphia, Pennsylvania, have invented certain Improvements in Skein-Reels, of which the following is a specification.

The object of my invention is to so construct a winding or skein reel as to permit the ready contraction or expansion of the same, and this object I attain in the manner hereinafter set forth, reference being had to the accompanying drawings, in which—

Figure 1 is a longitudinal section, partly in elevation, of a reel constructed in accordance with my invention, part of the supporting-frame being also shown. Fig. 2 is a transverse section on the line 1 2, Fig. 1. Fig. 3 is a similar view illustrating a slight modification in the construction of the reel. Fig. 4 is a view illustrating a further modification; and Fig. 5 is an enlarged sectional view illustrating a special mode of construction, whereby a positive movement of the reel-bars in both directions is effected.

The reel shown in Figs. 1 and 2 has a central hollow shaft, A, projecting radially from which are as many tubular studs, $a$, as there are arms B in the reel, the outer ends of the arms being connected to the longitudinal bars D of the reel, while the inner ends of the arms are free to slide in the tubular studs $a$ and project into the interior of the hollow shaft A, where they are acted upon by the expanders F, the latter consisting of conical shells secured to and moving with a central longitudinal rod, $b$, which is guided at one end in an internal bearing, $d$, in the shaft, and is threaded at the opposite end for adaptation to a nut, $f$, which is free to turn in the shaft, but is confined longitudinally thereto, the nut having an operating-wheel, $f'$, and being grooved externally for the reception of an internally-projecting pin, $c$, in the shaft, as shown in Fig. 1.

The bars D of the reel are connected by elastic bands G, the tendency of which is to draw said arms radially inward, and thus cause the arms B to bear firmly upon the expanders F; hence when said expanders are moved in the direction of the arrows in Fig. 1 the inner ends of the arms will be at liberty to enter the hollow shaft A and the reel will be contracted, so as to permit the ready application of the skeins to or their removal from the reel. On moving the expanders in the opposite direction the arms B will be projected and the reel expanded and held in the expanded condition by reason of the bearing of the inner ends of the arms B upon the cylindrical portions of the expanders F.

Pins $i$ on each of the reel-arms are adapted to slots $i'$ in the tubular studs $a$ of the shaft, so as to limit the extent of sliding movement of said arms.

The shaft A has at one end fast and loose pulleys $m$ $m'$, and some distance from the end of the shaft is a bevel-wheel, $n$, which gears into a bevel-pinion, $n'$, on a vertical shaft, $p$, which has at the upper end a crank-disk, $p'$, for driving the traverse bar.

In the modified form of reel shown in Fig. 3 a wire having coiled portions G' takes the place of the elastic bands G, while in Fig. 4 springs G', extending from the shaft to the bars of the reel, are used in place of said bands.

In the special form of reel shown in Fig. 5 the conical expander F and the inner ends of the arms B are slotted for engagement with each other, so that the movement of the arms in both directions is positively controlled. In this case, also, the hub of the expander is threaded, so as to form a nut, $f$, for adaptation to a threaded portion of the rod $b$, the engagement of the arms B with the expander preventing the turning of the latter with the rod, and consequently insuring proper longitudinal movement of said expander when the rod is rotated independently of the shaft. The expander may in this case be operated in a manner similar to that shown in Fig. 1, if desired.

Having thus described my invention, what I claim, and desire to secure by Letters Patent, is—

1. The combination of the hollow shaft of the reel, the bars of the same, the arms carrying said bars, conical expanders within the shaft for acting on said bars, and means for moving said expanders, all substantially as specified.

2. The combination of the hollow shaft, the reel-bars, arms carrying the same, a conical expander, a screw-rod, and a nut engaging with said rod, whereby when either rod or nut is turned a longitudinal movement is imparted to the expander, all substantially as specified.

3. The combination of the hollow shaft and its slotted studs, the reel-bars, the arms guided in the studs and having stop-pins adapted to the slots of the same, and conical expanders acting on the arms, all substantially as specified.

4. The combination of the hollow shaft, the reel-bars, the arms, the conical expanders, and the devices for moving the latter, both the arms and expanders being slotted for engagement with each other, all substantially as specified.

5. The combination of the hollow shaft, the reel-bars, the slotted arms, the conical expander slotted for engagement with said arms, and the threaded rod adapted to nuts on the expanders, all substantially as specified.

In testimony whereof I have signed my name to this specification in the presence of two subscribing witnesses.

JOSHUA GARSED.

Witnesses:
WILLIAM D. CONNER,
HARRY SMITH.